July 23, 1957 J. A. SCRUGGS 2,800,366
TANK SPRAYING APPARATUS
Filed Dec. 20, 1955 6 Sheets-Sheet 1

INVENTOR
Joseph A. Scruggs
BY R. S. A. Klougherty
ATTORNEY

July 23, 1957

J. A. SCRUGGS 2,800,366

TANK SPRAYING APPARATUS

Filed Dec. 20, 1955

INVENTOR
Joseph A. Scruggs
BY R. S. A. Hougherty
ATTORNEY

July 23, 1957

J. A. SCRUGGS 2,800,366

TANK SPRAYING APPARATUS

Filed Dec. 20, 1955

INVENTOR

Joseph A. Scruggs

BY R. S. A. Hougherty

ATTORNEY

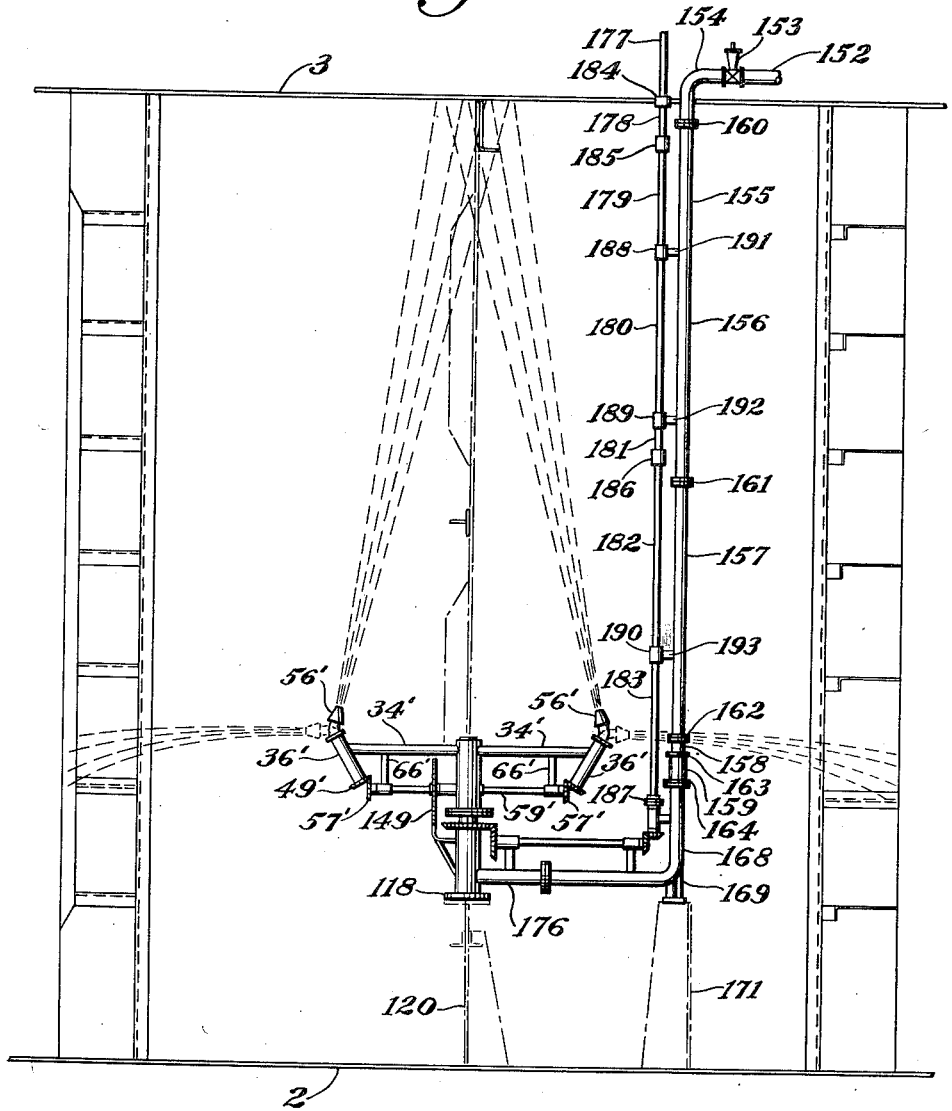

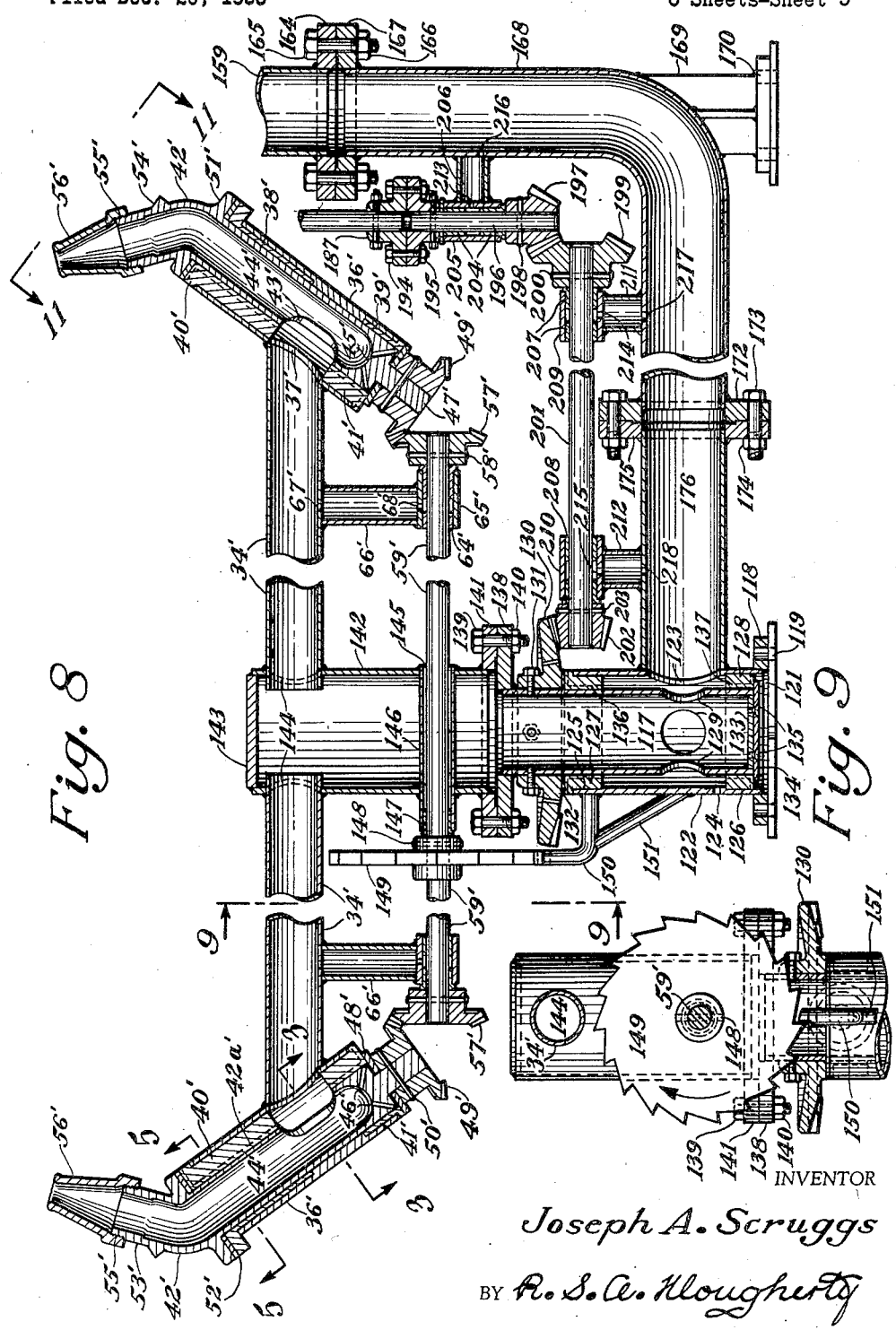

July 23, 1957
J. A. SCRUGGS
2,800,366
TANK SPRAYING APPARATUS
Filed Dec. 20, 1955
6 Sheets-Sheet 6
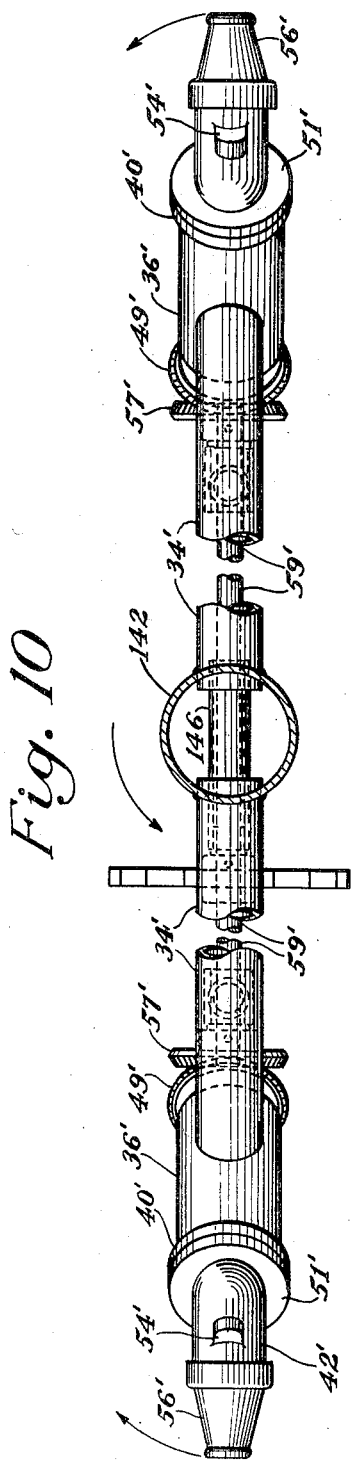
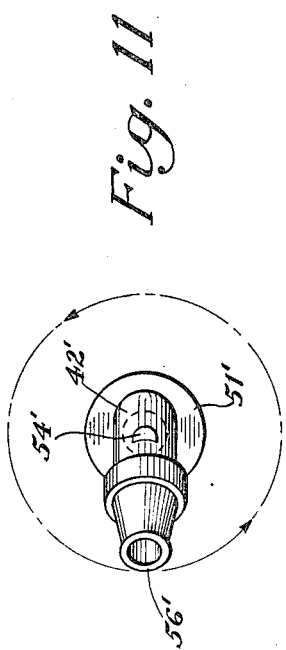
INVENTOR
Joseph A. Scruggs
BY R.S.A. Hougherty
ATTORNEY

United States Patent Office 2,800,366
Patented July 23, 1957

2,800,366
TANK SPRAYING APPARATUS

Joseph A. Scruggs, Vicksburg, Miss., assignor, by mesne assignments, to Shell Development Company, a corporation of Delaware Application December 20, 1955, Serial No. 554,256

6 Claims. (Cl. 299—62)

My invention relates in general to apparatus for spraying fluids, and more particularly to a rotary spraying apparatus which will provide efficient distribution of a chemical solution or the like intended to wash and reduce surface corrosion within the cargo compartments of an oil tanker or similar vessel.

In general, the problem is one of spraying a sufficient quantity of a chemical solution on all cargo tank surfaces to remove previous cargo residues and leave a protective coating on the tank surface, at the same time holding impingement and resulting erosion of tank surfaces to a minimum. Where a large number of fixed small nozzles is distributed throughout the tank so as to cover practically all tank surfaces, many of the small nozzle orifices and associated piping will eventually clog with scale, thus leaving some areas of the tank unwashed and subject to corrosion, and increasing the difficulty and cost of servicing the system. Also, the pumping equipment used must have a rather high rated capacity to supply any considerable number of small nozzles.

The present invention is a rotary spraying apparatus which provides maximum tank surface coverage from a minimum number of relatively large nozzles. These nozzles, being similar in size to standard 2½" fire hose nozzles, will not be subject to clogging, and the pipes thereto are also large and not subject to rapid deterioration.

In order to obtain maximum tank surface coverage from a few nozzles, it is necessary that these nozzles spray the surface from many positions and at various angles from these positions. The rotating arms disclosed herein provide an infinite number of positions around the circumference of their circle of rotation.

The rotating nozzles installed at the outer ends of the rotating arms serve two purposes; first, to provide spray at various angles from the base circle of rotation, and second, to control impingement and provide an effective spray pattern, especially when the nozzle is spraying the lower areas of the tank and a reduced spray velocity is desired. In order to control impingement and provide proper spray pattern, the rotating members on which the nozzles are mounted are constructed in the form of rotary valves timed to provide full flow and pressure when the nozzles are spraying the top areas of the tank and to provide reduced flow and pressure with an adequate spray pattern when the nozzles are spraying the lower areas of the tank surface.

One object of my invention, therefore, is to provide a spraying apparatus which will create optimum conditions of fluid throw, pattern and impingement at all angles and positions in its operating cycle.

Another object is a spraying apparatus having a pair of traveling nozzles mounted on the circumference of a circle of transport and rotatable in unison in opposite directions so as to throw spray in converging and diverging angles from any point on the circumference of the circle of transport.

Another object is a spraying apparatus including rotary valves mounted eccentrically in a housing disposed at an angle to the fluid supply pipe.

An additional object is a spraying apparatus wherein the fluid is projected through revolving offset nozzles.

A further object is a self-lubricating rotary spraying apparatus of large capacity and high effectiveness.

Still other objects, purposes and advantages will appear hereinafter in the specification, claims and drawings.

In the drawings:

Fig. 7 is a side elevation of a modification of the apparatus as installed in one of the wing tanks on either side of the center line tanks of a tank vessel;

Fig. 8 is a vertical transverse section of said modification;

Fig. 9 is a broken detail view showing the tripper and star wheel drive for the valve spindles and spray nozzles of said modification;

Fig. 10 is a top view, partly in section, illustrating the rotation of the moving arms and spray nozzles of said modification; and Fig. 11 is an end view.

The specific type or embodiment of my invention which should be used in any given location will depend largely on such conditions as the available compartment and deck space for piping and the like, and the location of interior structural members which may either interfere with the effective use of the sprays or the rotating arms, or serve to support the apparatus in the most convenient manner.

For example, in tank ships of the type having wing tanks on each side of center line tanks, the center line tanks amidships are usually about twice the width of the adjacent wing tanks, although their height and length may be approximately equal. The apparatus shown in Figs. 1–6, therefore, is generally preferable for use in center line tanks, while the remaining figures of the drawings show apparatus better adapted for use in the relatively narrow wing tanks.

Figure 1:
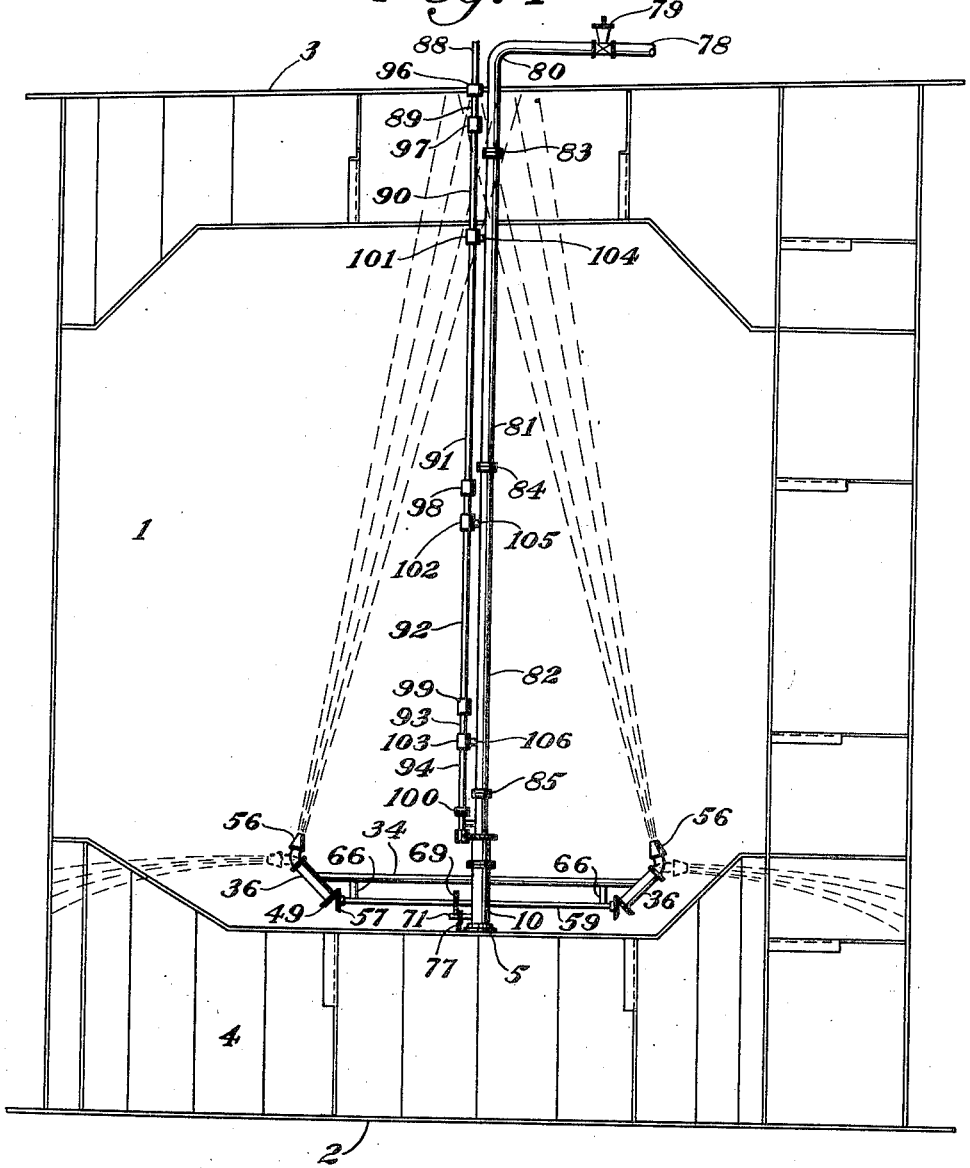
Fig. 1 is a side elevation of one embodiment of the apparatus as installed in one of the center line tanks of a large tank ship.

Fig. 1 shows the spraying apparatus as located in one of the center line tanks, designated by the reference numeral 1, disposed intermediate of the wing tanks (not shown), and extending from the ship's bottom 2 to the upper deck 3.

The center vertical keelson 4 in said tank compartment 1 provides a suitable foundation for the base plate 5 of the swivel assembly, said base plate 5 being secured to the top of the keelson 4 by means of conventional bolting or welding or the like. Said base plate 5 has a center hole 6 to allow drainage, and supports eight steel balls 7 in a ball bearing spacer ring 8 of "Micarta" or similar material, under a flange 9 welded to the bottom end of a large upright steel pipe 10. Clamp bars 11 and screws 12 center the flange 9 on the base plate 5 above the ball bearing spacer ring 8 meanwhile permitting the large pipe 10 to be rotated.

The top of said large pipe 10 is provided with a welded flange 13, which is secured by bolts 14 and nuts 15 to a similar flange 16 on an upper extension pipe 17 of the same diameter.

Press-fitted within the large lower pipe 10 is a pipe bushing 18, while a flanged bushing 19 inserted at the top of the extension pipe 17 is fastened to the said extension pipe 17 by the screws 20 and to the circumferential spur gear 21 by through bolts 22 and nuts 23. Each of the bushings 18 and 19 is provided with a plurality of longitudinal grooves 24 and 24a which permit the passage of sufficient fluid to lubricate them as bearings around a smaller stationary upright inner pipe 25 disposed concentrically therein and having a welded ring 26 and top flange 27 on its extended upper portion.

Said inner pipe 25 is provided with a closure disc 28 welded inside its lower end, to which an outer cap disc 29 is fastened by screws 30, with a small central hole 31 through both discs for drainage. The screws may be locked firmly in place by spot soldering or similar means if desired. Said inner pipe 25 is also provided with a plurality (here four) of evenly spaced ports 32 about its circumference above the bushing 18, said ports being adapted to register successively with a pair of opposite orifices 33 in the large outer pipe 10 when the latter is rotated.

Welded to the large vertical pipe 10 and extending outwardly in opposite directions from the orifices 33 are a pair of horizontal tubular arms 34, the outer ends of which may be reduced in diameter as at 35 by swaging or like means, to each of which outer ends is welded in outwardly angularly tilted relation a valve housing 36. Said valve housing 36 may be made of extra-heavy steel pipe, having a side orifice 37 communicating with the reduced open end 35, and bored inside at top and bottom as at 38 and 39 to receive the flanged eccentric bushings 40 and 41. Rotatably mounted in said housing 36 and bushings 40 and 41 is the valve body 42, with longitudinal lubricating grooves 42a and a side fluid entry port 43 opening into the elongated tubular chamber 44, closed at the bottom 45 except for lubricating holes 46, with an extended integral lower portion 47 whereon are mounted a washer 48 and bevel gear 49 secured by pin 50. The upper end of said valve body 42 has an integral shoulder portion 51 engaging a washer 52 on the upper flanged bushing 40, and a curved offset portion 53 with a triangular boss 54 and terminal pipe threads 55 upon which is screwed a large nozzle 56.

In driving engagement with each of the bevel gears 49 is another bevel gear 57 secured by pin 58 on each end of a drive rod 59. Said drive rod 59 extends transversely through holes 60 and 61 in the central pipe 10 and is mounted in bushings 62 in a short pipe 63 welded on the pipe 10 and in bushings 64 in the pipes 65 extending in line therewith parallel to and beneath each of the tubular arms 34, being suspended therefrom by short pipes 66 welded between said arms 34 and said pipes 65. Lubricating fluid is conducted by pipes 66 from small holes 67 and 68 in the tubular arms 34 and pipes 66.

A spur gear 69 secured by pin 70 on the drive rod 59 meshes with a pinion gear 71 mounted with washer 72 and star wheel 73 on a stub shaft 74 journaled in bushings 75 mounted in a pipe 76 welded onto the central pipe 10 below the pipe 63. An angle bar tripper 77 fixed to the base plate 5 will actuate said star wheel 73 to impart relatively slow rotation to the valve bodies 42 and nozzles 56 as the outer pipe 10 is rotated about the inner pipe 25.

Conventional tank and pumping means (not shown) on the deck 3 will supply the liquid used for spraying through an inlet pipe 78, valve 79, elbow 80 and vertically depending pipes 81 and 82, connected together by intermediate flanges 83 and 84 and having a bottom flange 85 attached by bolts 86 and nuts 87 to the top flange 27 of the fixed inner pipe 25.

A hydraulic motor (not shown) or other suitable driving means preferably mounted on the upper deck 3 is operatively connected to vertical shaft means comprising a series of rods 88, 89, 90, 91, 92, 93, 94 and 95, said rods being connected by intermediate couplings 96, 97, 98 and 99 and bottom flanged coupling 100, and rotatably mounted parallel to the fluid supply pipes in bearings 101, 102 and 103, mounted on spacers 104, 105 and 106.

Figure 2:
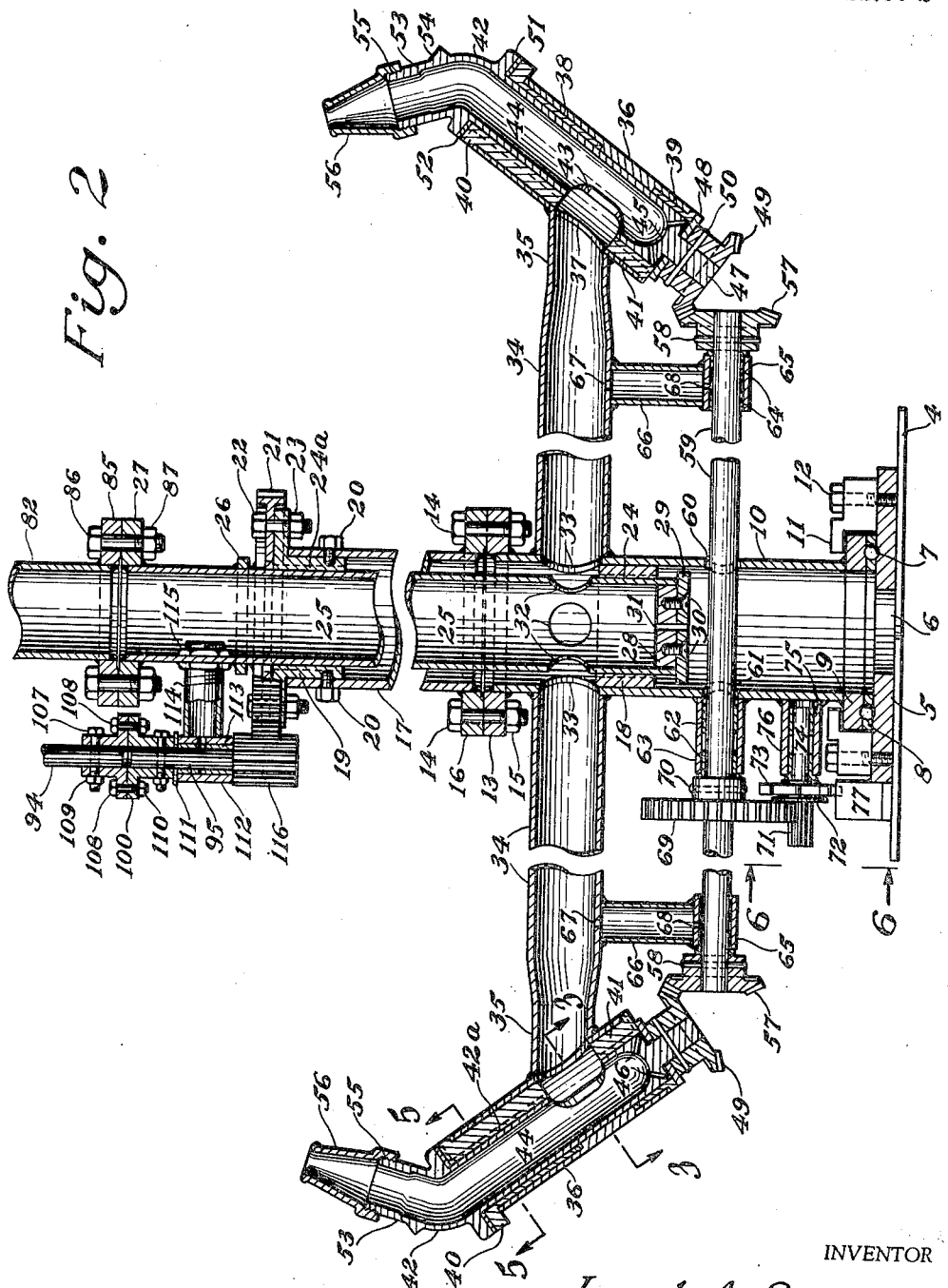
Fig. 2 is a vertical transverse section of said apparatus showing details of the rotating swivel and valve assemblies.
Figure 3:
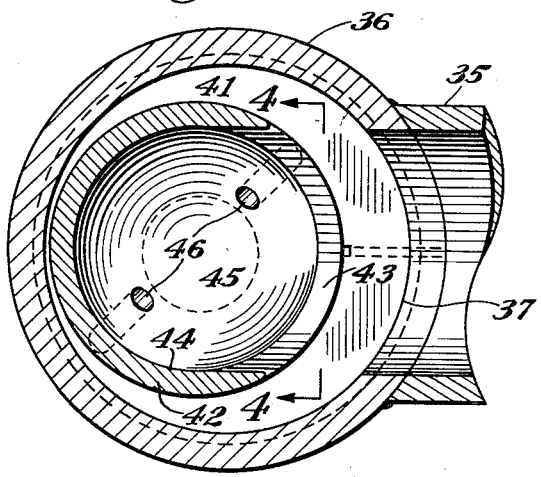
Fig. 3 is a transverse section of an eccentric rotary valve beneath one of the rotating spray nozzles, being taken on the line 3—3 of Fig. 2.
Figure 4:
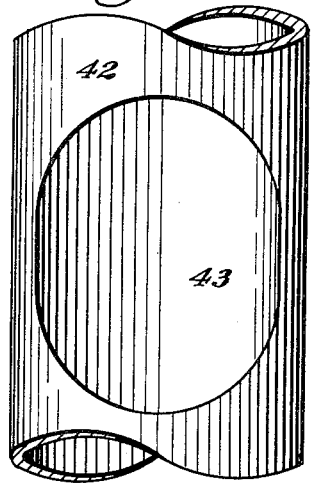
Fig. 4 is a broken detail view showing the port in the body of said valve.
Figure 5:
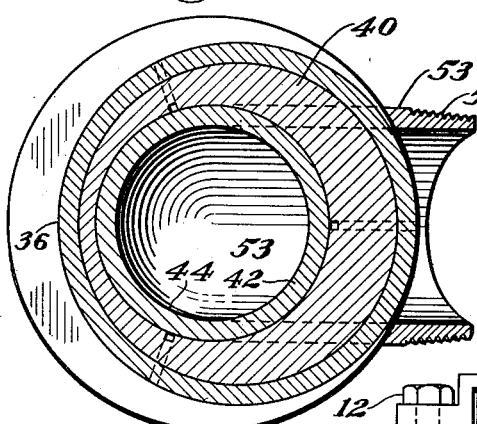
Fig. 5 is a transverse section of said nozzle taken on the line 5—5 of Fig. 2.
Figure 6:
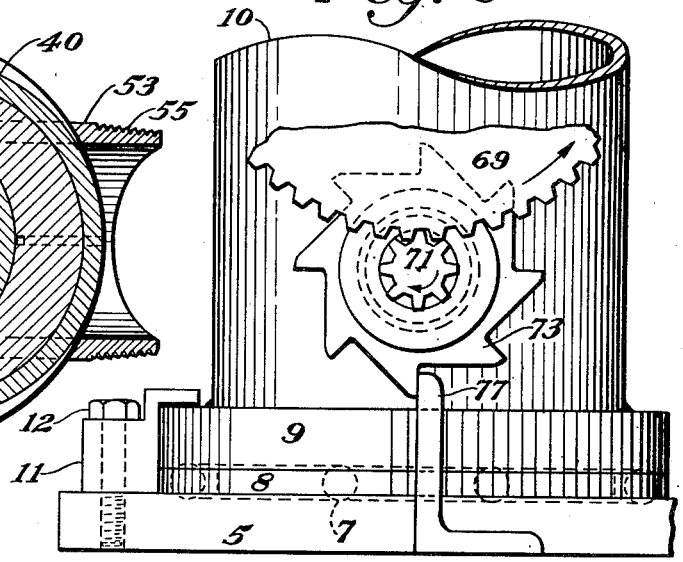
Fig. 6 is a broken detail view showing the tripper, star wheel and spur gear by which the valve spindles and spray nozzles are simultaneously rotated.

As shown in Fig. 2, the flanged coupling 100 is attached to the rods 94 and 95 by means of through bolts 107 and 108 and nuts 109 and 110 thereon.

A washer 111 on the rod 95 beneath the flanged coupling 100 serves to space it from the bearing 112, within which the rod 95 is free to rotate inside pipe bushings 113 having longitudinal grooves (not shown) to permit a limited flow of lubricating fluid therethrough from the inner pipe 25 through the spacer pipe 114 which projects into said inner pipe 25 where it is secured by lock nuts 115. A pinion 116 secured to the bottom end of the rod 95 is in meshing engagement with the spur gear 21 for rotating the outer pipe 17 carrying the revolving arms and spray nozzles.

The modification of the apparatus illustrated in Figs. 7 to 11 of the drawings is particularly suitable for use in small wing tanks, or in any compartment where a fluid supply pipe positioned directly above the spraying apparatus might interfere unduly with the direct overhead action of the spray.

The spray nozzles, rotary valve spindle and associated parts carried by the revolving tubular arms are essentially the same as in the previously described apparatus, and are therefore designated by the corresponding numerals with superscript primes. The tubular arms 34' dispense with a reduced end portion, but will serve the same purpose.

The fluid supply pipe and the driving mechanism are, however, somewhat differently arranged, being to one side rather than directly above the center of rotation of the revolving arms 34', and the bottom inner pipe 117 is here the rotating member of the central valve admitting fluid to said arms 34'.

The swivel portion of this assembly comprises a base plate 118, having bolt holes 119 for mounting on any suitable support, for example, one of the transverse frame members as indicated by the reference numeral 120 in Fig. 7. Welded within a large central hole 121 in said base plate 118 is a large upright pipe 122, having a large fluid inlet hole 123 and a drain hole 124 and bored inside at top and bottom as at 125 and 126 to receive the flanged upper bushing 127 and the bottom pipe bushing 128.

Concentrically disposed within the bushings 127 and 128 in the large upright pipe 122 is the above-mentioned smaller pipe 117, having a plurality (here four) of evenly spaced ports 129 adapted to register successively with the fluid inlet hole 123 as the said inner pipe 117 is rotated by the spur gear 130 fastened thereto by bolts 131 and seated on the washer 132 above the flanged bushing 127. Welded inside the bottom of said inner pipe 117 is a closure disc 133, with an outer cap disc 134 fastened thereto by screws 135. The flanged upper bushing 127 has lubricating grooves 136 extending for its full length and across its top face, and the lower bushing 128 has similar grooves 137 extending lengthwise and across its bottom face.

A flange 138 welded to the upper end of the inner pipe 117 is secured by bolts 139 and nuts 140 to another flange 141 welded to the bottom end of a large upright pipe 142 closed at the top by a circular plate 143. Said upright pipe 142 is provided with transverse holes 144 into which are welded the tubular arms 34' supporting the valve housings 36' and nozzles 56', and smaller holes 145 thereunder in which is welded a transverse pipe 146 wherein a bushing 147 supports the rotatable drive rod 59' terminating in bevel gears 57' engaging bevel gears 49'. On said drive rod 59', a pin 148 serves to attach the star wheel 149, which during operation engages the upright tripper bar 150 held rigidly in place on the large stationary bottom pipe 122 by a brace rod 151 welded beneath said tripper bar 150.

The liquid to be sprayed is supplied through the inlet pipe 152, valve 153, and elbow 154 on the deck 3 at a convenient distance to one side of the axis of rotation of the apparatus as shown in Fig. 7, through vertically downward pipes 155, 156, 157, 158 and 159, joined by intermediate flanges 160, 161, 162 and 163, and having a bottom flange 164. Said bottom flange 164 is attached by bolts 165 and nuts 166 to a flange 167 on the upper end of an elbow 168 mounted on brackets 169 fastened through bolt holes 170 to any suitably rigid support such as the transverse frame 171. Said elbow 168 has a flange 172 attached by bolts 173 and nuts 174 to a mating flange 175 on a horizontal pipe 176 welded to the large upright pipe 122 at the hole 123.

Power from any suitable prime mover is transmitted through vertical shafting comprising a series of rods 177, 178, 179, 180, 181, 182 and 183 provided with intermediate couplings 184, 185 and 186 and lower flanged coupling 187. Said rods rotate within bearings 188, 189 and 190 mounted parallel to the fluid supply line by spacers 191, 192 and 193.

As illustrated in Fig. 8, the lower flanged coupling 187 is attached by bolts 194 and nuts 195 to the short rod 196 having on its lower end a bevel gear 197 secured thereon by a pin 198 and meshing with a bevel gear 199 secured by a pin 200 onto a horizontal rod 201. Said rod 201 terminates in a bevel gear 202 attached by pin 203 and in meshing engagement with the spur gear 130 and imparts rotation to the revolving spray arms. The rod 196 is journaled in bushings 204 in bearings 205 mounted by a pipe spacer 206 on fluid supply elbow 168. Bushings 207 and 208 in pipe bearings 209 and 210 support the shaft 201 on pipe spacers 211 and 212. Holes 213, 214 and 215 in the bearings 205, 209 and 210 receive fluid from the holes 216, 217 and 218 in the supply elbow 168 and pipe 176.

The combination of the above features, properly proportioned, will provide a spray cone of about 10 feet diameter at varying distances of 5 feet to 60 feet throw from the nozzle. This is accomplished with substantially the same spray impingement force and spray coverage at any point within the above range of 5 feet to 60 feet.

Under operating conditions, this apparatus has been proven to be most reliable and dependable. Wetting efficiency is high, even with low pressures. All parts of the tank surface above the spray nozzle can be reached by the spray either by direct action or runoff. Positive indications and control of system operation may be had from the deck units. The relatively large pipes and nozzles are not subject to clogging or rapid deterioration due to scale or the like. The only small pipes used may be on deck where they may be readily inspected and serviced. Bearing and tooth pressures are low, being designed for water lubrication. All operating parts are accessible for inspection without staging.

Although I have described my invention hereinabove in considerable detail, I do not desire to have it limited to the exact and specific details stated, but I may also make such modifications, substitutes or equivalents thereof as are included within the scope and spirit of the invention or pointed out in the appended claims.

I claim:

1. Spraying apparatus comprising a fluid supply pipe, means for revolving said pipe about an axis at right angles to the axis of said pipe, a cylindrical housing at the outer end of said pipe and disposed at an angle to the axis of the pipe, a tubular member eccentrically rotatable within said housing and having a port for the admission of fluid thereto, an offset nozzle connected to said tubular member, and means for rotating said nozzle and tubular member.

2. Spraying apparatus comprising a fluid supply pipe, means for rotating said pipe in a plane about an axis at right angles to the axis of said pipe, a tubular housing at the outer end of the pipe and disposed at an angle thereto, a rotatable hollow member mounted eccentrically in said housing and having a port disposed at an oblique angle to the pipe, a nozzle mounted on said hollow member at an angle thereto, and means for rotating said hollow member and nozzle in conjunction with the rotation of the pipe.

3. Spraying apparatus comprising a fluid supply pipe having an inlet end and a discharge end, means to rotate said pipe on an axis normal to the axis of the pipe, a valve housing at the discharge end of the pipe having an elongated body at an angle to the axis of the fluid supply pipe and having a central fluid supply chamber, a hollow rotatable valve body eccentrically mounted in said valve housing and having an inlet opening into said central fluid supply chamber, an angularly disposed nozzle at the outer end of said valve body, and means to rotate said valve body intermittently.

4. Spraying apparatus comprising a fluid supply pipe, means for revolving said pipe about an axis at right angles to the axis of said pipe, a cylindrical housing at the outer end of said pipe and disposed at an angle to the axis of the pipe, a tubular member eccentrically rotatable within said housing and having a port for the admission of fluid thereto, an offset nozzle connected to said tubular member and coacting means for rotating said nozzle and tubular member to throw sprays in progressively converging and diverging angles from any point on the circumference of the circle of transport of said housing.

5. Spraying apparatus comprising a fluid supply pipe, means for rotating said pipe about an axis at right angles to the axis of said pipe, a cylindrical housing at the outer end of said pipe and disposed at an angle to the axis of the pipe, a tubular member eccentrically rotatable within said housing and having a port for the admission of fluid thereto, an offset nozzle connected to said tubular member and coacting means for rotating said tubular member and nozzle to throw a spray of varying flow and pressure.

6. Spraying apparatus comprising a plurality of fluid supply pipes, means for revolving said pipes about an axis at right angles to the axes of said pipes, a cylindrical housing mounted at the outer end of each one of said pipes and disposed at an angle to the axis of the respective pipe to which it is attached, a tubular member eccentrically rotatable within each one of said cylindrical housings and having a port for the admission of fluid thereto, an offset nozzle connected to each one tubular member and means for rotating each nozzle and tubular member.

References Cited in the file of this patent
UNITED STATES PATENTS

| | | |
|---|---|---|
| 1,557,240 | Butterworth | Oct. 13, 1925 |
| 1,657,990 | Blouin | Jan. 31, 1928 |
| 2,208,813 | Ostling et al. | July 23, 1940 |